United States Patent [19]
Grubb

[11] 3,991,247
[45] Nov. 9, 1976

[54] PIPE LAGGING CLOTH AND COMPOSITION

[75] Inventor: Wyndl Theron Grubb, Greensboro, N.C.

[73] Assignee: Burlington Industries, Inc., Greensboro, N.C.

[22] Filed: Jan. 31, 1975

[21] Appl. No.: 546,083

[52] U.S. Cl. ................................. 428/241; 106/74; 106/DIG. 4; 428/261; 428/268; 428/273; 428/331; 428/332; 428/350
[51] Int. Cl.$^2$ .................. B32B 1/10; B32B 13/14; B65H 81/106; C04S 1/100
[58] Field of Search ............ 428/261, 273, 350, 426, 428/241, 268, 323, 331, 332; 106/DIG. 4, 74, 84

[56] References Cited
UNITED STATES PATENTS 3,769,072  10/1973  Echerd et al. ..................... 428/261

OTHER PUBLICATIONS

Grim, *Applied Clay Mineralogy*, McGraw-Hill, N.Y., 1962, pp. 12, 19, 43, 84, 247–251 and 264.

Von Wazer, *Phosphorous and its Compounds,* Vol. II, Interscience, N.Y., 1961, pp. 1665–1667 and 1674–1680.

*Primary Examiner*—J.C. Cannon
*Attorney, Agent, or Firm*—Cushman, Darby & Cushman

[57] ABSTRACT

Improved non-flammable, rewettable pipe lagging material is formed from woven glass fabric which has been impregnated and coated with an adhesive formulation composed of Western Bentonite clay, kaolin, sodium hexametaphosphate, and water. The woven glass fabric is initially heat treated so as to thermally desize the fabric and remove initial oil and starch sizing present on the glass yarn from which fabric is made. The fabric is then contacted with the adhesive formulation and dried to form a rewettable cloth material which is white in color having a smooth surface.

3 Claims, No Drawings

PIPE LAGGING CLOTH AND COMPOSITION

BACKGROUND OF THE INVENTION

Pipe lagging material such as cloth and the like are used to provide protective coverings and insulation to pipe conduits. The material is generally composed of a base, such as a fabric, which is wrapped or "lagged" around either the outside insulation on a pipe in order to hold the insulation in place or the pipe itself in order to protect the contents of the pipe against thermal gain or loss. Such pipe lagging cloths are commonly applied to furnaces or boilers, electrical insulations and the like. It is desirable that such material be fireproof or flame-resistant and capable of withstanding high temperatures. It is further desirable that such material be safe to handle and possess sufficient adhesive properties to be retained on the pipe under various conditions of use.

Conventionally, lagging cloth is applied by itself directly to the component, or alternatively as an overlying wrap covering the thermal insulation placed about the component.

Most lagging material employed heretofore in the art has been formed of a material having an asbestos fiber base, and due to the health hazards normally associated with asbestos fibers, a need has arisen for an improved and safe high temperature material that could be used as a base for manufacturing pipe lagging material. The high temperature properties of glass fibers have led to the discovery that woven glass fabric provides a suitable pipe lagging product provided that a satisfactory coating meeting all the requirements of a rewettable adhesive is used in conjunction therewith.

Care must be taken in selecting a woven glass fabric that would not cause skin irritation, since the user of a rewettable pipe lagging material would come into intimate contact with the woven glass cloth during installation. It is also essential that the glass fabric have a high temperature coating which would be safe to handle, and at the same time, meet all the requirements of a rewettable lagging fabric. In manufacturing rewettable lagging fabric it is of prime importance that the material conform to irregular surfaces when wet, and possess sufficient dry and wet adhesion that the material adheres to the wrapped article. Safety and health considerations dictate that the material be non-flammable as well as non-toxic, and esthetic requirements require that the material possess a smooth white attractive outer surface after application so as to necessitate only a minimum of painting in order to achieve water-proofness. Furthermore, the pipe lagging materials should possess non-ravelling properties and be non-corrosive when used in combination with stainless steel.

The prior art has developed a number of materials, none of which heretofore have successfully met all the requirements as outlined above. For example, we have found that the product described in U.S. Pat. No. 3,839,079 does not form a satisfactory pipe lagging fabric since the material contains insufficient coating to give a smooth surface and the composition of the adhesive is such that it is impossible to apply enough coating to fill all the interstices of the fabric. A further short coming of the material described in U.S. Pat. No. 3,839,079 resides in the fact that the glass yarns are designated as long staple strands of glass fibers as disclosed in U.S. Pat. Nos. 2,584,517, 2,621,444, and 3,425,204. The yarn described in these later three patents is composed of staple glass fibers having a diameter in the range of 0.00028 inches and greater, and are known to cause irritation when in contact with the skin.

U.S. Pat. No. 3,769,072 describes a pipe lagging material which is primarily an asbestos base material noted for its flexibility and drapeability both in the dry and wet state. The reference also alludes to a porous base made of various other fibers such as cellulose, synthetic, proteinaceous, mineral, glass, asbestos, ceramic, and siliceous. Contrary to the description set forth in U.S. Pat. No. 3,769,072, we have found that when the adhesive composition described therein is applied to a woven fiberglass fabric, the resultant product is not a flexible and drapable product, but rather is a rigid, stiff product that does not lend itself readily to application as a pipe lagging material.

We have now found that the short comings of the prior art fabrics can be overcome by employing a base fabric and adhesive coating formulation according to the present invention. Accordingly, it is the primary object of the present invention to provide a glass fabric and a high temperature coating that is safe to handle and at the same time meets all the requirements of a rewettable lagging fabric, such as ability to conform to an irregular surface when wet and possess dry and wet adhesion to adhere to the wrapped article.

It is a further object of the present invention to provide a composition suitable for producing a pipe lagging material which possesses a smoth white attractive outer surface after application so as to require a minimum of painting and maintenance.

A still yet further object of the present invention is to provide a method for providing an improved pipe lagging material of the type hereinbefore indicated.

SUMMARY OF THE INVENTION

The rewettable, nonflammable lagging cloth produced according to the present invention is composed of woven glass fabric whose yarns are made from glass fibers having a diameter of 0.00021 inches or less. Such yarns of a diameter less than 0.00021 inches are free from irritation to those who come into intimate contact therewith. Glass fibers having such a diameter carry the trade designation of DE filament. Other available glass fibers having diameters of for example 0.00018 inches are designated as C filament, while glass fibers having a diameter of 0.00015 carry a designation of B filament. While a satisfactory non-irritating pipe lagging fabric can easily be manufactured from commercial glass fibers having filaments of DE, C, B filament or smaller diameter sizes, the preferred size is made from C filament glass yarn. The woven glass fabric employed according to the present invention may be formed by any of a number of conventional means such as described in U.S. Pat. No. 3,839,079, the contents of which are incorporated herein by reference. Selection of a sufficient number of ends and picks in the woven glass fabric employed as a lagging material is needed in order to produce a smooth surface product. Generally speaking, the higher the number of ends and picks in the fabric, the smoother the fabric.

In order to achieve the other properties desired with the pipe lagging material according to the present invention, the woven glass cloth fabric referred to above is impregnated and coated with a special inorganic adhesive formulation. The glass fabric is saturated with the adhesive formulation in an amount of about 60 to 90% add-on solids (i.e. on a dry basis) based on the weight of the untreated fabric. When the amount of add-on is less than about 60%, the outer surface of the resulting pipe lagging fabric is not smooth, and the weave of the fabric becomes plainly visible, thereby requiring multiple coatings of paint in order to achieve a satisfactory appearance and water proofness. With a solids add-on however of about 60 to 90%, the resulting lagging cloth has an outer surface which is smooth, and the fabric weave is hidden and thus only one coat of paint is necessary to achieve the desired appearance and water proofness properties.

The adhesive formulation which is impregnated into the glass fabric is composed of bentonite clay, kaolin, and sodium hexametaphosphate.

In developing the adhesive formulation according to the present invention, various bentonite clays were tested for performance as a rewettable adhesive and it was found that Western Bentonite clay yielded the best results. Western Bentonite clay is a sodium bentonite clay having a high swelling capacity in water. In contrast, Southern Bentonite clay, which is calcium bentonite, has negligible swelling in water and is therefore unsatisfactory for the materials produced according to the present invention. The amount of Western Bentonite clay added to the fabric according to the present invention, ranges from about 30 to 55% dry weight of the formulation.

The addition of kaolin is used to achieve the high add-on required for a satisfactory rewettable lagging fabric. Kaolin does not materially increase the adhesive properties of the formulation, but rather is used as a filler in achieving the high add-on. We have found unexpectedly that the fabric impregnated with the adhesive compound containing both kaolin and bentonite, is more easily applied in the wet state to the article being lagged than a fabric impregnated with bentonite alone. The type of kaolin (hydrated aluminum silicate) preferably used in the present invention in combination with the bentonite clay has an average particle size of 0.20 microns or less. Such materials are commercially available such as Hydrite U.F. from Georgia Kaolin Company, Elizabeth, New Jersey. This type of kaolin is preferred since the smaller the particle size, the higher the water demand which contributes to the rewettable properties of the adhesive composition. The amount of kaolin added to the formulation according to the present invention ranges from about 43.75 to about 69.75% based on the dry weight of the formulation.

Addition of sodium hexametaphosphate to the formulation is essential in order to control the viscosity so as to increase the penetration of the adhesive formulation into the glass cloth. Generally from about 0.25 to 1.25% by weight of sodium hexametaphosphate based on the dry weight of the formulation is employed. It is preferred that the viscosity of the adhesive formulation added-on range from between 10,000 to 18,000 centipoises as measured on a Brookfield Viscometer with a number 6 spindle at 10 rpm.

The adhesive formulation according to the present invention, on a dry-basis, has the following composition:

| | % Solid of Total Dry Formulation |
|---|---|
| Western Bentonite clay | 30–55 |
| Kaolin | 43.75–69.75 |

-continued

| | % Solid of Total Dry Formulation |
|---|---|
| Sodium hexametaphosphate | 0.25–1.25 |

The formulation is mixed with water to provide an aqueous formulation having a viscosity between about 10,000 and 18,000 centipoises. The aqueous formulation is then applied to the woven cloth fabric in such amounts that upon drying the fabric contains a solids add-on (of adhesive formulation) ranging from about 60 to 90% by weight of the fabric.

A typical adhesive formulation which may be applied to the woven glass fabrics according to the present invention in the amount of from 60 to 90% solids add-on consists of the following ingredients (all percentages being by weight):

| Ingredient | Adhesive A lbs | % Formula |
|---|---|---|
| Water | 395.20 | 75.15 |
| Western Bentonite Clay (Tower Bond - 200 mesh) | 50.00 | 9.50 |
| Kaolin | 80.00 | 15.20 |
| Calgon* | 0.80 | 0.15 |
| | 526.00 | 100.00 |

*8.0 lbs. of 10% solution of sodium hexametaphosphate $(Na_3PO_4)_6$ - 7.2 lbs. water being included as part of 395.20 lbs.

The adhesive formulation according to the present invention when mixed to form an aqueous dispersion has the following composition:

| | % by Weight of Aqueous Formulation |
|---|---|
| Western Bentonite Clay | 8–12 |
| Kaolin | 10–20 |
| Sodium Hexametaphosphate | 0.10–0.30 |
| Water | 71.90–77.70 |

Prior to the application of the finish, the fabric is either continuously thermally desized at temperatures between about 1100° and 1300° F. for a period of between about 3 to 10 seconds, or batch oven desized for 60 to 70 hours at temperatures of from about 600° to 700° F.

Two types of woven glass fabric suitable for producing the lagging cloth according to the present invention have the following construction:

```
Fabric A —  warp yarn    — 20 ends ECC 37-2 ply 401 textured
            fill yarn    — 14 picks ECC 37-2 ply 401 textured
            oz/sq. yd.   — 13.0
            Thickness    — 0.042"
Fabric B —  warp yarn    — 18 ends ECC 75 ½–401 textured
            fill yarn    — 14 picks ECC 75 ½–401 textured
            oz/sq. yd.   — 8.7
            Thickness    — 0.034"
```

The following represents a specific embodiment of the preferred material according to the present invention. Two quantities of Fabric A and B described above, were thermally desized at a temperature of about 1200° F. for a period of about 4 seconds in order to remove the initial oil and starch sizing present on the glass yarn. By so desizing the glass yarn it is easier to completely wet and penetrate the fabric with the adhesive formulation. After thermally desizing, the fabrics were passed continuously into a coating solution of the following formulation, water 75.15%, Western Bentonite Clay (Tower Bond - 200 mesh obtained from Black Hills Bentonite Co., Mills, Wyoming) 9.50%, Hydrite U.F. 15.20%, Calgon 0.15%.

The saturated fabrics were then passed through metering bars in order to achieve an add-on of 70%. The materials were then dried in order to remove the water. The resultant products were white in color and could be rewet simply by immersion in water. The weight of the finished product was as follows:

Fabric A — 20.8 to 24.8 oz/sq. yd.
Fabric B — 13.9 to 16.1 oz/sq. yd.

The fabrics were tested and were found to pass the requirements of MIL-I-24244 for resistance to corrosion of stainless steel.

The invention in its broader aspects is not limited to the specific details described, but departures may be made from such details within the scope of the accompanying claims without departing from the principles of the invention. Furthermore, the invention may comprise, consist of, or consist essentially of the hereinbefore recited components and steps.

What is claimed is:

1. A non-drapable, non-flammable, rewettable pipe lagging material having a smooth white outer surface and consisting essentially of woven thermally desized glass fabric composed of yarns consisting of glass fibers having a diameter of 0.00021 inches or less, said fabric having been impregnated and coated with an adhesive formulation consisting essentially of by weight on a dry basis:
   a. about 30 to 55% western bentonite clay as a rewettable adhesive;
   b. about 43.75 to 69.75% kaolin having an average particle size of 0.20 microns or less so as to achieve high add-on such that said fabric is more easily applied in the wet state to the article being lagged than if said fabric were impregnated with bentonite alone;
   c. about 0.25 to 1.25% of sodium hexametaphosphate to control the viscosity, and
   d. water, said formulation having a viscosity in the range of from between about 10,000 to 18,000 centipoises as measured on a Brookfield Viscometer with a number 6 spindle at 10 rpm, being impregnated and coated on said fabric in an amount of at least 60% based on the weight of said fabric.

2. The material of claim 1 wherein said fibers have a diameter between about 0.00015 and 0.00021 inches.

3. The material of claim 1 wherein the amount of said adhesive formulation impregnated and coated on said fabric ranges from about 60 to 90% as solids based on the weight of said fabric.

* * * * *